Aug. 22, 1939.  R. J. A. INGOUF  2,170,719

WIRE MESH FABRIC FOR WIRE GLASS

Original Filed June 19, 1936

Inventor
Robert J. A. Ingouf
by his Attorneys
Hauson & Hauson

Patented Aug. 22, 1939

2,170,719

UNITED STATES PATENT OFFICE 2,170,719

WIRE MESH FABRIC FOR WIRE GLASS

Robert J. A. Ingouf, Kingsport, Tenn., assignor to Fidelity Machine Company, Wilmington, Del., a corporation of Delaware Original application June 19, 1936, Serial No. 86,184, now Patent No. 2,160,715, dated May 30, 1939. Divided and this application June 7, 1937, Serial No. 146,905

4 Claims. (Cl. 245—8)

This invention relates to wire mesh fabric which, among various uses, is adapted for the manufacture of wire glass, i. e., of sheet glass having wide mesh wire fabric imbedded therein intermediate the opposite faces thereof and lying substantially parallel to and substantially equidistant from each of the opposite faces of the glass sheet, such for example as used in garage doors, factory windows, skylights, etc.

The present application constitutes a division of the copending application of Sidney B. Blaisdell and Robert J. A. Ingouf, Serial No. 86,184, filed June 19, 1936, which matured into Patent Number 2,160,715, dated May 30, 1939.

Usually the wire fabric employed in sheet glass of the type noted is of the form commonly known as hexagonal mesh wherein a series of laterally spaced wires extend in a general direction longitudinally of the sheet and at spaced intervals throughout the length thereof adjacent pairs of wires are drawn together and twisted about each other to secure the wires in place to produce the open mesh of the screen.

One objection to the construction above noted is that, when the hot molten glass is being applied to the opposite faces of the wire mesh fabric, the twisted portions of the wires entrain and hold a body of air, which when the glass cools, appears as bubbles in the center of the glass around and adjacent the wire twistings.

Another objection to that construction is that since the artistic effect would be spoiled were an opening glazed with some sheets of hexagonal mesh wire glass running with vertical twists, while other sheets ran with horizontal twists, the preparation of sheets having the twists running all the same way necessarily leads to an important loss of glass in cutting such sheets.

The object of the present invention is to remove all above mentioned objections by making it possible and practical to produce wire glass which will be devoid of bubbles, which will require a minimum cutting loss in preparing sheets for glazing, and the wire mesh of which will, through its particular construction and the manner in which its several wires are secured together at their intersections be sufficiently strong to withstand handling and to strengthen the glass in which it is incorporated.

The wire mesh which is the object of the present invention is composed of an open mesh wire fabric wherein the wires extend diagonally across the fabric, from side to side thereof, and wherein in place of the wires being twisted about each other, the wires will intersect and pass over and under each other at predetermined relatively spaced crossings respectively; and wherein, in order to prevent displacement of the wires at the crossings during the application of the molten glass, the wires are welded, sweated, fused, or otherwise and preferably permanently and integrally attached one to the other at each or at every desired number of the crossings.

Figure 1:
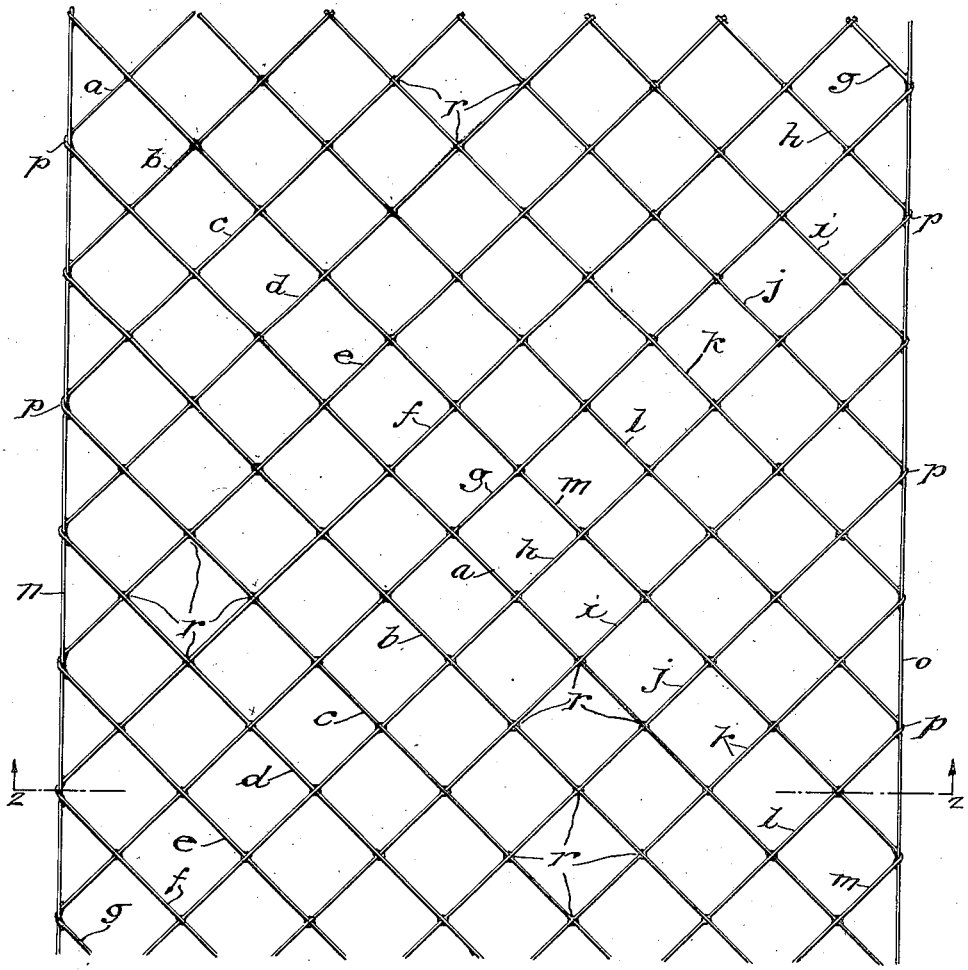
Fig. 1 is a diagrammatic face view of the fabric.
Figure 2:
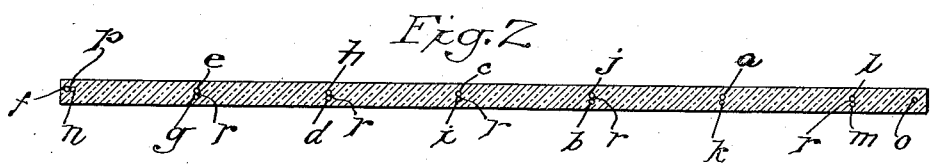
Fig. 2 is a transverse section on the line 2—2, Fig. 1, showing the fabric in a sheet of glass.

Obviously, the wire screen may be of any desired width and the wires may be spaced apart to any desired extent depending upon the use to which the screen is to be put. In the present instance, the screen, as noted above, is intended for use in what is commonly termed "wire-glass" and for that purpose the wires are usually spaced approximately three-quarters of an inch apart.

In the present instance, as a matter of illustration, there are thirteen diagonal wires, designated $a$ to $m$ respectively and two selvage wires $n$ and $o$ respectively.

The diagonal wires are interbraided with each other over the entire area of the fabric, crossing over and under each other at all or part of the points $r$, intermediate the selvage wires $n$ and $o$ and passing around the selvage wires at the points $p$.

The wires at all or part of the points $r$ are secured together as by fusing, welding, sweating, soldering, etc., and preferably in a manner permanently and integrally uniting each pair of wires at each crossing $r$.

If desired, the selvage wires may be held in the fabric merely by the bending of the diagonal wires around the selvage wires. However, it is preferred that the selvage wires be permanently connected to the diagonal wires at the point $p$ in the same manner as the diagonal wires are integrally united at the points $r$.

I claim:

1. An article of manufacture consisting of a flat braided wire mesh fabric comprising a multiplicity of continuous body wires extending diagonally across the fabric in opposite directions continuous and in laterally spaced intersecting and interlaced relation to each other each diagonal wire extending over two and under two intersecting diagonal wires alternately across the fabric.

2. An article of manufacture consisting of a braided wire mesh fabric comprising a multiplicity of continuous body wires extending diagonally across the fabric in opposite directions continuous and in laterally spaced intersecting and interlaced relation to each other each diagonal wire extending over two and under two intersecting diagonal wires alternately across the fabric with the wires fused together at all or part of the intersections.

3. An article of manufacture consisting of a braided wire mesh fabric comprising laterally spaced substantially parallel selvage wires and a multiplicity of continuous body wires intersecting and passing around the selvage wires at uniformly spaced points longitudinally thereof and extending diagonally across the fabric in opposite directions continuous and in laterally spaced intersecting and interlaced relation to each other between the selvage wires each diagonal wire extending over two and under two intersecting diagonal wires alternately across the fabric.

4. An article of manufacture consisting of a braided wire mesh fabric comprising laterally spaced substantially parallel selvage wires and a multiplicity of continuous body wires intersecting and passing around the selvage wires at uniformly spaced points longitudinally thereof and extending diagonally across the fabric in opposite directions continuous and in laterally spaced intersecting and interlaced relation to each other between the selvage wires each diagonal wire extending over two and under two intersecting diagonal wires alternately across the fabric with the body wires fused to each other and to the selvage wires at all or part of the intersections thereof.

ROBERT J. A. INGOUF.